US007671275B2

(12) United States Patent
Kubota

(10) Patent No.: US 7,671,275 B2
(45) Date of Patent: Mar. 2, 2010

(54) ELECTRICAL CONNECTION BOX

(75) Inventor: Katsuhiro Kubota, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 150 days.

(21) Appl. No.: 11/839,588

(22) Filed: Aug. 16, 2007

(65) Prior Publication Data

US 2008/0053678 A1 Mar. 6, 2008

(30) Foreign Application Priority Data

Aug. 31, 2006 (JP) ............................ 2006-236060

(51) Int. Cl.
*H02G 3/08* (2006.01)

(52) U.S. Cl. ....................... 174/50; 174/520; 174/17 R; 174/58; 439/535; 439/76.1; 439/76.2

(58) Field of Classification Search .................. 174/50, 174/520, 17 R, 53, 58, 59, 480, 481, 503, 174/489, 66, 67; 220/3.2-3.9, 4.02, 241, 220/242; 439/76.1, 76.2, 949, 535, 563, 439/573

See application file for complete search history.

(56) References Cited

U.S. PATENT DOCUMENTS

| | | | | |
|---|---|---|---|---|
| 4,954,085 | A | 9/1990 | Inoue et al. | |
| 5,769,660 | A | 6/1998 | Sakurai et al. | |
| 6,774,309 | B2 * | 8/2004 | Kasai | 174/50 |
| 7,156,677 | B2 * | 1/2007 | Yamane | 439/949 |
| 7,253,356 | B2 * | 8/2007 | Kiyota et al. | 174/50 |
| 7,255,597 | B2 * | 8/2007 | Nakamura et al. | 439/535 |
| 7,291,024 | B2 * | 11/2007 | Kiyota et al. | 439/76.2 |

FOREIGN PATENT DOCUMENTS

| | | | |
|---|---|---|---|
| DE | 3735920 | C1 | 11/1988 |
| DE | 3824857 | A | 9/1990 |
| DE | 19706790 | A1 | 8/1998 |
| DE | 112004000690 | T9 | 6/2007 |
| EP | 0368115 | A2 | 5/1990 |
| JP | 07039047 | A | 2/1995 |
| JP | 2001118628 | A | 4/2001 |
| JP | 2002-152943 | A | 5/2002 |

OTHER PUBLICATIONS

Yamamoto et al (US2006/0292902 A1) "Attachment Structure for Electrical Junction Box", Dec. 28, 2006.*
German Office Action dated Jan. 22, 2009.

* cited by examiner

*Primary Examiner*—Angel R Estrada
(74) *Attorney, Agent, or Firm*—Sughrue Mion, PLLC

(57) ABSTRACT

An electrical connection box includes a box body. The box body has a top wall and a side wall. The top wall is inclined to a horizontal plane and has an edge portion arranged at a lower side in an inclination of the top wall. The side wall is connected to an edge portion of the top wall. A drainage channel is provided along the edge portion of the top wall. A drainage port is provided at an edge of the drainage channel. The drainage port is placed at a position spaced from the side wall.

7 Claims, 5 Drawing Sheets

ELECTRICAL CONNECTION BOX

BACKGROUND OF THE INVENTION

The present invention relates to an electrical connection box mounted in a vehicle, such as an automobile.

Generally, electrical connection boxes have electric components, such as a wiring board, a fuse, a relay, and a connector. However, for example, an electrical connection box to be mounted in an automobile is sometimes installed in an engine room. Thus, such an electrical connection box takes a waterproof countermeasure to prevent electric components, such as a wiring board, from being short-circuited due to water caused by, e.g., an automobile wash to enter an engine room (see, e.g., JP-A-2002-152943).

As illustrated in FIG. 5, JP-A-2002-152943 discloses an electric connection box 101. A wiring board 103, on which a fuse housing 102 is mounted, is mounted in the electrical connection box 101 so as to be substantially perpendicular to a surface thereof. The fuse housing 102 has drainage grooves 104*a* and 104*b* and a water-stop wall 105. A drainage channel 106 is provided on the wiring board 103 so as to extend from the fuse housing 102 to a side end of the wiring board 103. Incidentally, reference numeral 107 designates an electric component such as a relay.

Water on the fuse housing 102 is caused by the wall 105 to flow along the grooves 104*a* and 104*b* without flowing out to the surroundings of the fuse housing 102. Then, the water flows along the drainage channel 106 leading to the side end portion of the wiring board 103. Finally, the water runs off. Thus, water on the fuse housing 102 does not run down from the fuse housing 102 along the surface of the wiring board. Consequently, the electric component 107 mounted below the fuse housing 102 can be prevented from being short-circuited due to water.

A drainage structure of the electrical connection box disclosed in JP-A-2002-152943 is configured so that water is discharged along a side end portion, on which neither wiring and nor electric components are mounted, in the wiring board 103. However, there is a fear that due to external factors, for example, vehicle vibrations and a negative pressure, water trickling along the side end portion of the wiring board 103 may run to the other part of the wiring board 103 until discharged completely, so that wiring or electric components may be short-circuited.

Incidentally, the drainage structure disclosed in JP-A-2002-152943 is provided on the inner side of the electrical connection box. However, even in the case where a drainage structure is provided on the outer side of the electrical connection box, when water is made to trickle along a side wall surface of the electrical connection box to run down, there is a fear that during water trickles along the side wall surface of the electrical connection box, the water may enter the electrical connection box and short-circuit internal wiring and electric components, due to the external factors, or to a capillary phenomenon occurring between a body and a lid for covering the body, both of which generally constitute the electrical connection box.

SUMMARY OF THE INVENTION

The invention is accomplished in view of the aforementioned circumstances. An object of the invention is to provide an electrical connection box, which can surely prevent wiring and electric components from being short-circuited.

In order to achieve the above objects, according to the present invention, there is provided an electrical connection box, comprising:

a box body which includes:

a top wall which is inclined to a horizontal plane and which has an edge portion arranged at a lower side in an inclination of the top wall; and a side wall which is connected to an edge portion of the top wall;

a drainage channel which is provided along the edge portion of the top wall; and a drainage port which is provided at an edge of the drainage channel, wherein the drainage port is placed at a position spaced from the side wall.

Preferably, the side wall is perpendicular to the top wall.

Preferably the box body is shaped into a substantially rectangular parallelepiped.

Preferably the electrical connection box further comprises a bracket which mounts the box body to an outer part in an inclined condition.

In the above configuration, water on the top wall surface of the electrical connection box inclined to a horizontal plane flows into the drainage channel provided along the lower-placed edge of the top wall surface. Then, the water is discharged from the drain port provided at one end of the drainage channel. Because this drain port is placed at a horizontally outer side than the side wall surface, which is connected to an edge of the top wall surface, in the electrical connection box, the water discharged from the drain port runs down without trickling the side wall surface of the electrical connection box. Consequently, water can be prevented from entering the inside of the electrical connection box. Accordingly, the internal wiring and electric components can be prevented from being short-circuited.

The side wall is perpendicular to the top wall, which is inclined to a horizontal plane, of the electrical connection box. Or the electrical connection box shaped like a rectangular parallelepiped is attached to a mount member by being tilted so that the top wall surface is inclined to a horizontal plane. Thus, the drain port is naturally placed at a horizontally outer side than the side wall surface of the electrical connection box. Accordingly, it is unnecessary to protrude the drain port largely from the side wall surface. The miniaturization of the electrical connection box can be achieved. Also, water can be prevented by a simple structure from entering the inside of the electrical connection box. Consequently, the internal wiring and electric components can be prevented from being short-circuited.

The invention can provide an electrical connection box, which can surely prevent wiring and electric components from being short-circuited.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein.

DETAILED DESCRIPTION OF THE PREFERRED EMBODIMENTS

Hereinafter, a preferred embodiment of the invention is described with reference to the accompanying drawings.

Figure 1:
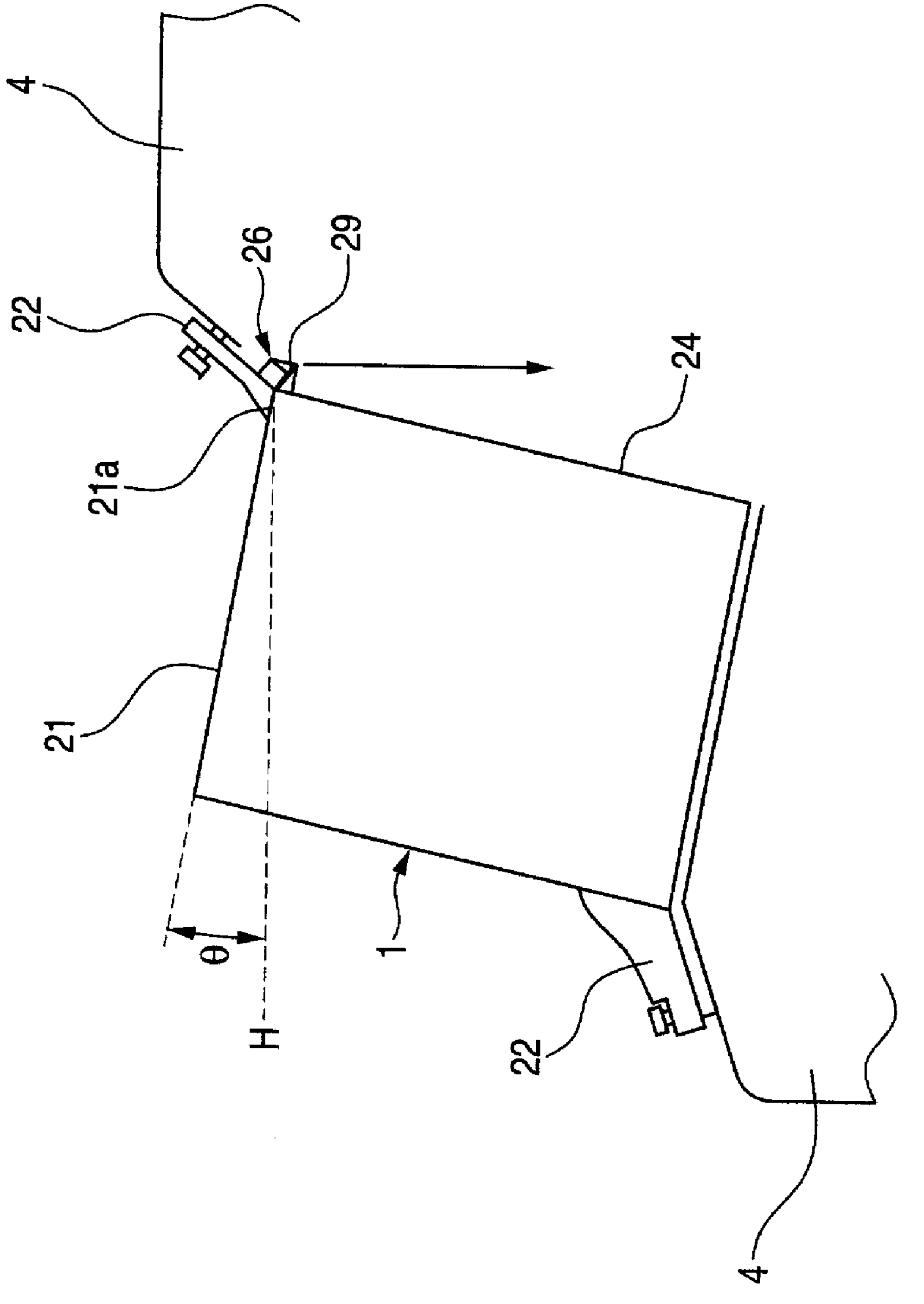
FIG. 1 is a side view illustrating an embodiment of an electrical connection box according to the invention.
Figure 2:
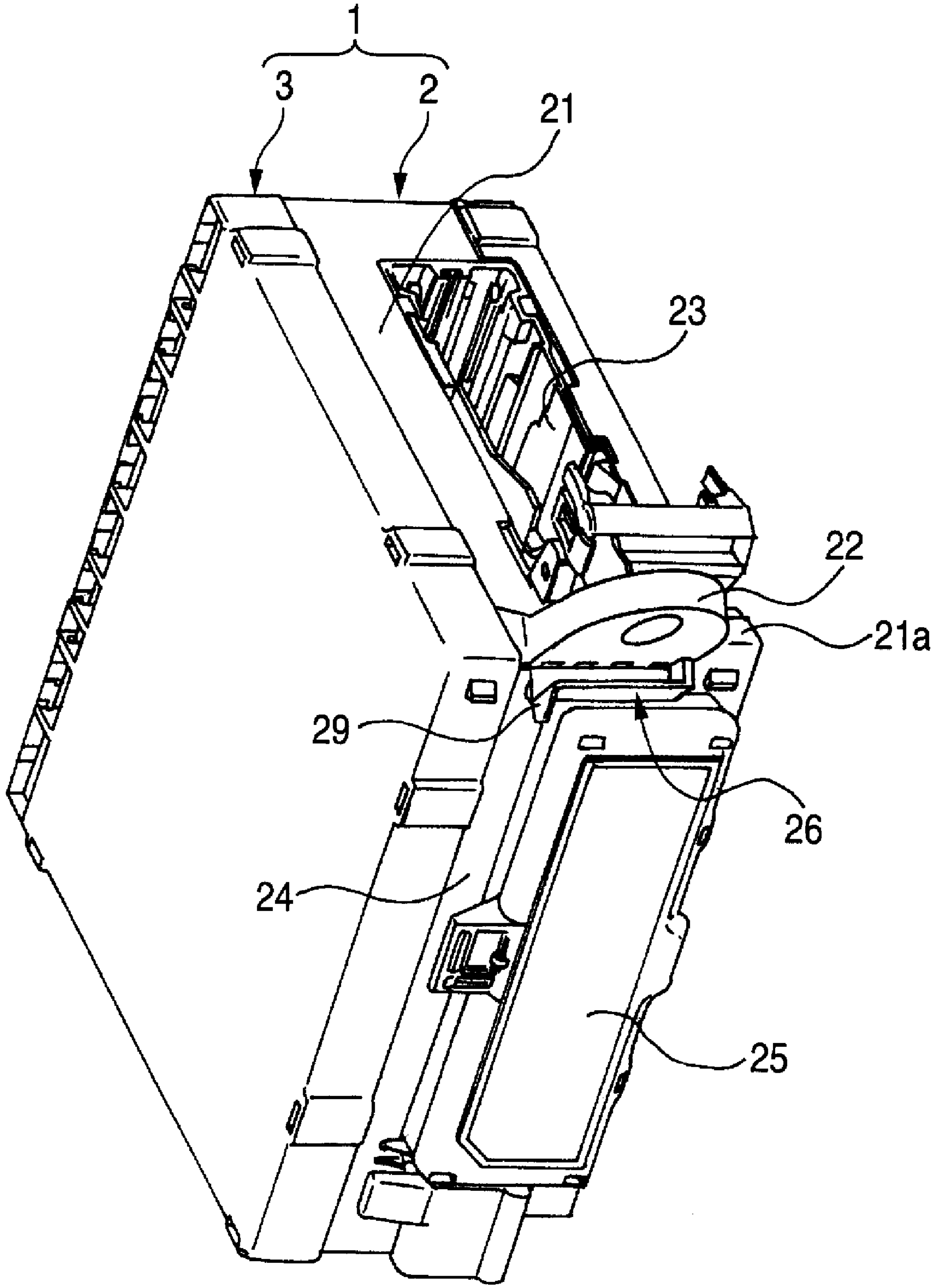
FIG. 2 is a perspective view illustrating the electrical connection box shown in FIG. 1.

As shown in FIGS. 1 and 2, an entire electrical connection box 1 according to the present embodiment is shaped like a substantially rectangular parallelepiped. The electrical connection box 1 has a substantially rectangular parallelepiped box body 2 which is opened in one surface thereof, and a lid 3 which closes the opening of the box body 2.

The box body 2 is attached to mount members 4, for example, a vehicle frame, through brackets 22 so that the opening is directed horizontally, and that the top wall surface 21 is inclined to the horizontal plane H at a predetermined angle θ. The lid 3 is fit onto an edge portion of the opening of the box body 2 to thereby close the opening directed horizontally.

The brackets 22 are provided at diagonally opposing paired corner portions of the box body 2, respectively. One of the brackets 22 is provided at the lower-placed edge 21*a* among edges of the top wall surface 21, which define the corner portions of the box body 2, to protrude therefrom, and is fixed to an associated one of the mount members 4 by appropriate process, such as fastening.

A connector insertion port 23 is opened in the top wall surface 21 of the box body 2. For example, a connector connected to a wire harness wired in a vehicle is inserted into the insertion port 23. Incidentally, the gap between the connector and the peripheral edge of the insertion port 23 is appropriately waterproofed by interposing, for example, a rubber packing therebetween.

A containing port communicating with a containing portion in the connection box is provided in the side wall surface 24 of the box body 2. The containing portion contains electric components such as a fuse and a relay. The side wall surface 24 is connected to the edge 21*a* of the top wall surface 21. The containing port is closed by a cover 25 openably and closably attached to the side wall surface 24.

Figure 3:
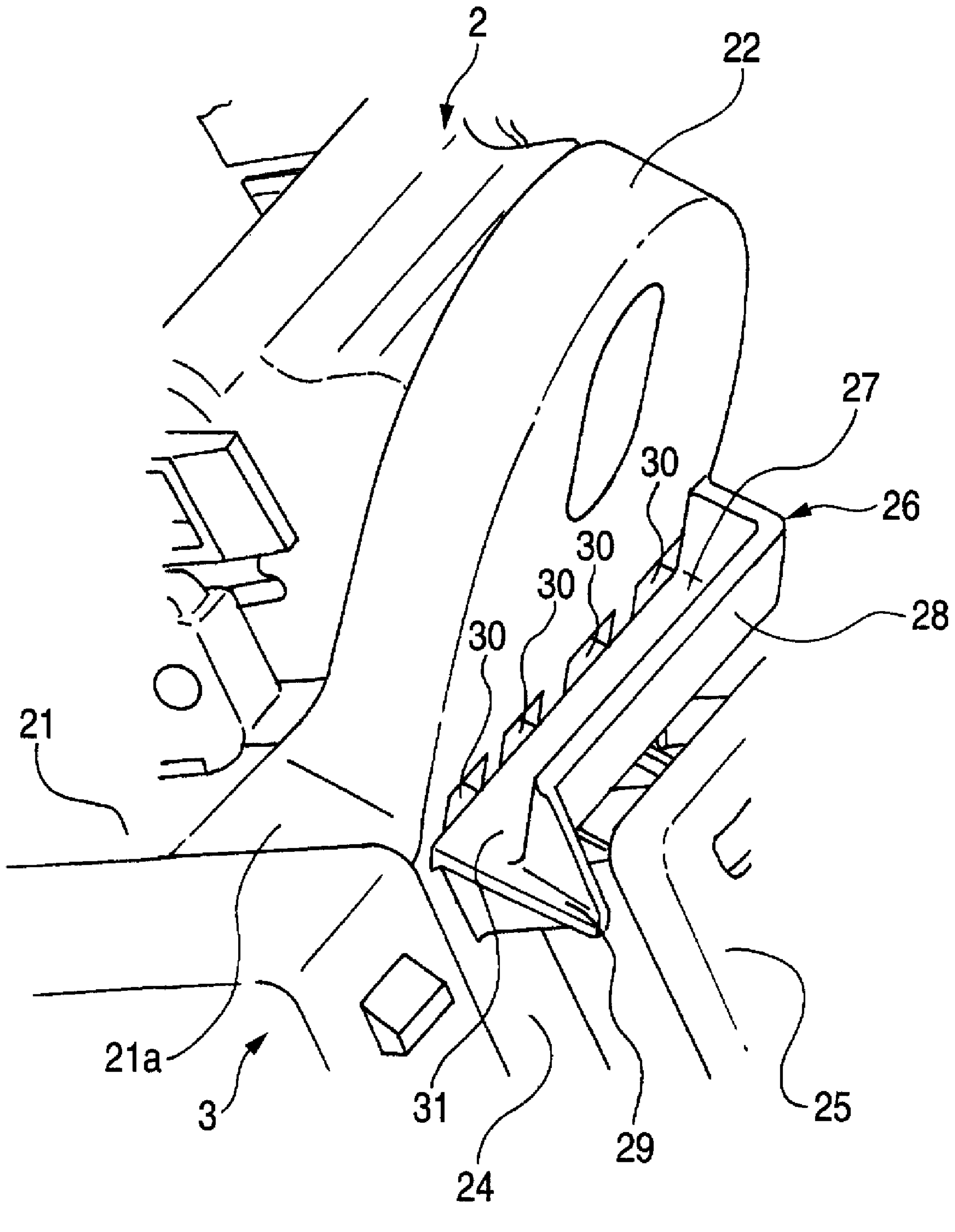
FIG. 3 is a perspective view illustrating a primary part of the electrical connection box shown in FIG. 2.
Figure 4:
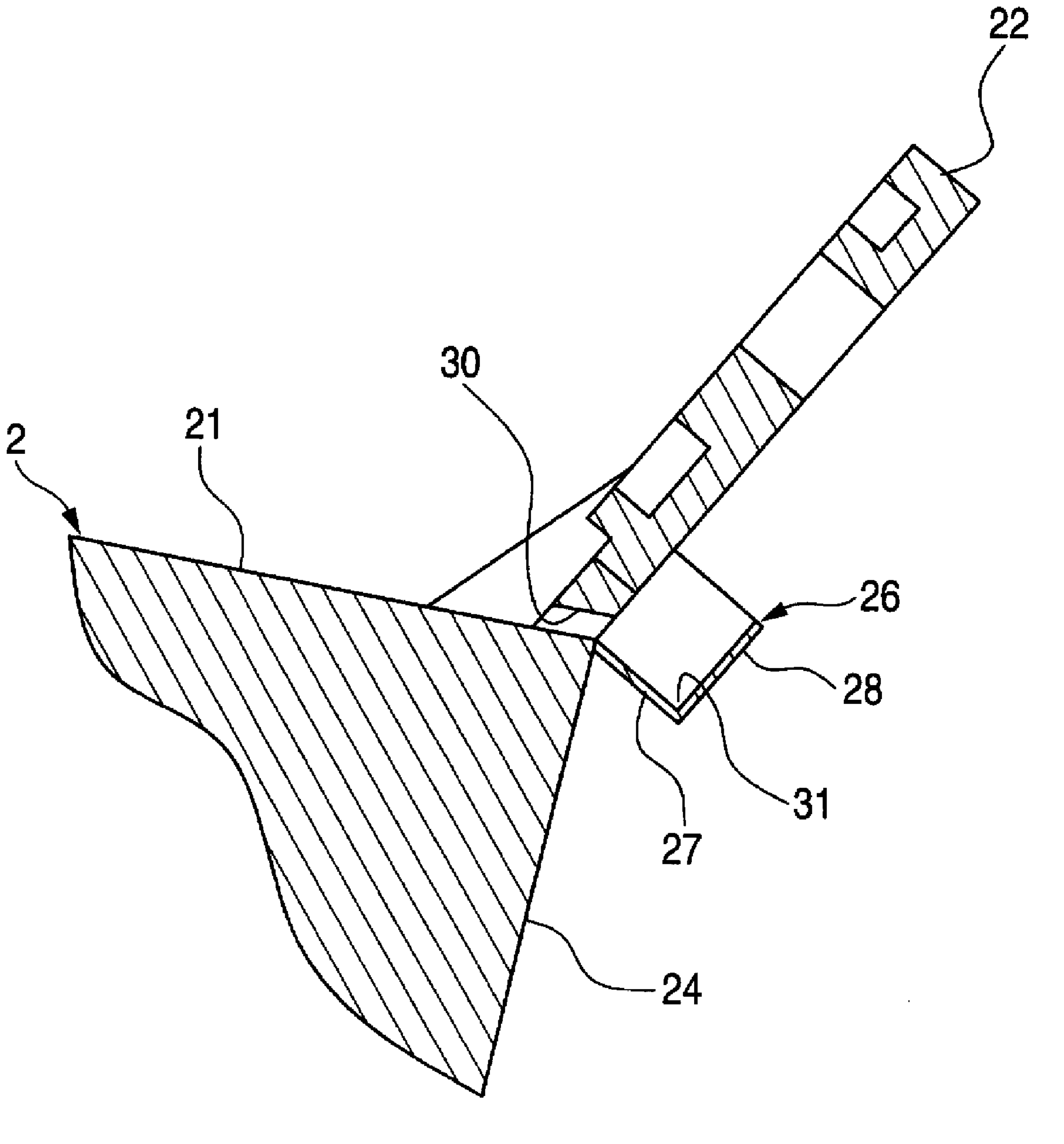
FIG. 4 is a cross-sectional view illustrating the primary part of the electrical connection box shown in FIG. 3.
Figure 5:
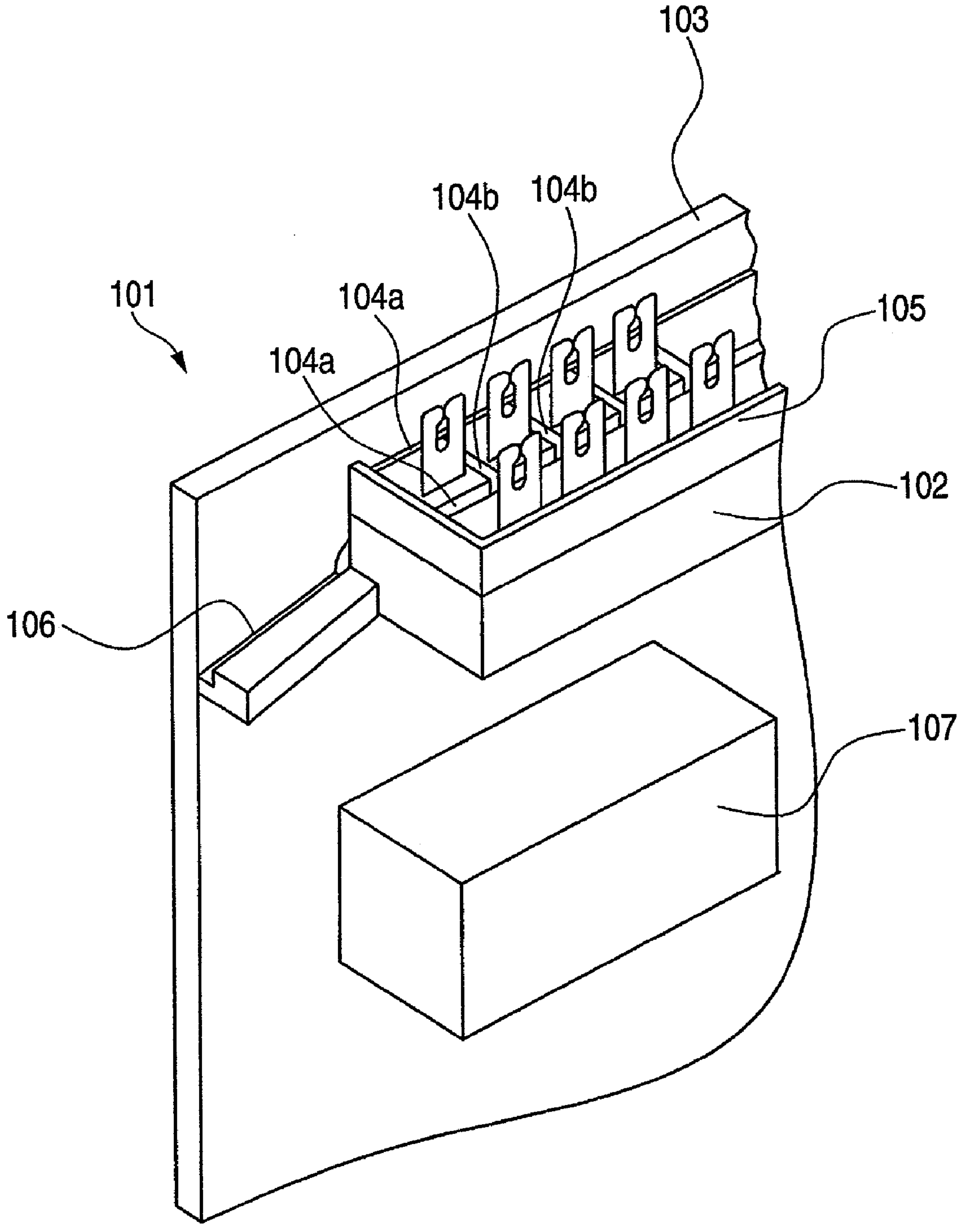
PRIOR ART FIG. 5
FIG. 5 is a perspective view illustrating a primary part of a conventional drainage structure of an electrical connection box.

Referring further to FIGS. 3 and 4, a drainage channel 26 is provided along the edge 21*a* of the top wall surface 21. The drainage channel 26 has a bottom plate 27, which is provided continuously to the edge 21*a* by being more inclined to the horizontal plane H than the top wall surface 21, and a frame board 28 erected on the outer edge of the bottom plate 27. An end of the drainage channel 26 is closed by the frame board 28. The other end of the drainage channel 26 is opened and serves as the drain port 29.

A plurality of through holes are bored in the base portion of the bracket 22 connected to the edge 21*a* of the top wall surface 21 of the box body 2. Water applied to the top wall surface 21 flows into the drainage channel 26 via the through holes 30.

Because the bottom plate 27 is more inclined to the horizontal plane H than the top wall surface 21 of the bottom body 2, the water having flowed into the drainage channel 26 is collected in a corner portion 31 defined by the bottom plate 27 and the frame board 28, which are spaced from the side wall surface 24 of the box body 2. Then, the water flows along the corner portion 31 to the drain port 29.

Incidentally, the box body 2 shaped substantially like a rectangular parallelepiped is attached to the mount members 4 by being tilted so that the top wall surface 21 is inclined to the horizontal plane H. The drain port 29 is configured by extending the bottom plate 27 and the frame board 28 to be more spaced from the side wall surface 24 of the box body 2 than the corner portion 31. That is, the drain port 29 is defined by extension parts of the bottom plate 27 and the frame board 28 as a corner part provided continuously from the corner portion 31. Consequently, the drain port 29 is placed at a horizontally outer side than the side wall surface 24 of the box body 2.

The water having flowed along the corner portion 31 toward the drain port 29 flows out from the drain port 29. Because the drain port 29 is placed at a horizontally outer side than the side wall surface 24 of the electrical connection box 1, the water discharged from the drain port 29 runs down vertically without trickling the side wall surface 24 of the electrical connection box 1 (see FIG. 1). Consequently, water can be prevented from entering the inside of the electrical connection box 1 through the gap between the box body 2 and the lid 3, which is placed above the side wall surface 24, or through the gap between the cover 25, which closes the containing port, and the box body 2.

As described above, the electrical connection box 1 according to the present embodiment, water on the top wall surface 21 of the electrical connection box 1 inclined to a horizontal plane H flows into the drainage channel 26 provided along the lower-placed edge 21*a* of the top wall surface 21. Then, the water is discharged from the drain port 29 provided at one end of the drainage channel 26. Because the drain port 29 is placed at a horizontally outer side than the side wall surface 24, which is connected to the edge 21*a* of the top wall surface 21, in the electrical connection box 1, the water discharged from the drain port 29 runs down without trickling the side wall surface 24 of the electrical connection box 1. Consequently, water can be prevented from entering the inside of the electrical connection box 1. Accordingly, the internal wiring and electric components can be prevented from being short-circuited.

The electrical connection box 1 shaped like a rectangular parallelepiped is attached to a mount member by being tilted so that the top wall surface 21 is inclined to a horizontal plane H. In this situation, the drain port 29 is naturally placed at a horizontally outer side than the side wall surface 24 of the electrical connection box 1. Accordingly, it is unnecessary to protrude the drain port 29 largely from the side wall surface 24. The miniaturization of the electrical connection box 1 can be achieved. Also, water can be prevented by a simple structure from entering the inside of the electrical connection box 1. Consequently, the internal wiring and electric components can be prevented from being short-circuited.

The invention is not limited to the aforementioned embodiment. Appropriate modifications and improvements can be made. The materials, shapes, dimensions, numeric values, modes, numbers, locations, and the like of the composing elements of the aforementioned embodiment are optional and are not limited to specific ones, as long as an electrical connection box according to the invention can be achieved.

What is claimed is:

1. An electrical connection box, comprising:

a box body which includes:

a top wall; and a side wall which is connected to an edge portion of the top wall;

a drainage channel which is provided along the edge portion of the top wall at which the side wall is connected to the wall; and a drainage port which is provided at an edge of the drainage channel, wherein the drainage port is placed at a position spaced from the side wall.

2. The electrical connection box as set forth in claim 1, wherein the side wall is perpendicular to the top wall.

3. The electrical connection box as set forth in claim 1, wherein the box body is shaped into a substantially rectangular parallelepiped.

4. The electrical connection box as set forth in claim 1, further comprising a bracket which mounts the box body to a mount member.

5. The electrical connection box as set forth in claim 4, wherein the bracket has a through hole for passing water dropped on the top wall to the drainage channel therethrough.

6. The electrical connection box as set forth in claim 4, wherein the box body is mounted to the mount member in an inclined condition in which the top wall is inclined with respect to a horizontal plane and the drainage channel is arranged at a lower side of the inclined top wall.

7. The electrical connection box as set forth in claim 1, wherein the drainage channel has a corner portion which is opposite to the edge portion of the top wall, and the drainage port is extended from the corner portion toward a direction separate from the side wall.

* * * * *